United States Patent [19]
Mrotek et al.

[11] Patent Number: 5,674,640
[45] Date of Patent: Oct. 7, 1997

[54] HOUSING SYSTEM FOR A MULTI-CELL BATTERY

[75] Inventors: Edward N. Mrotek, Grafton; Noreen D. Gilbertsen, Whitefish Bay, both of Wis.

[73] Assignee: Globe-Union, Inc., Milwaukee, Wis.

[21] Appl. No.: 611,438

[22] Filed: Mar. 4, 1996

Related U.S. Application Data

[63] Continuation-in-part of Ser. No. 326,823, Oct. 20, 1994, abandoned.

[51] Int. Cl.$^6$ ............................................. H01M 10/12
[52] U.S. Cl. ..................... 429/163; 429/153; 429/154; 429/180
[58] Field of Search .......................... 429/153, 154, 429/155, 163, 175, 176, 178, 180, 186

[56] References Cited

U.S. PATENT DOCUMENTS

| | | | |
|---|---|---|---|
| 1,692,316 | 11/1928 | Smith | 429/163 |
| 1,905,319 | 4/1933 | Sturges | 429/163 |
| 2,222,412 | 11/1940 | King | 429/163 |
| 2,737,542 | 3/1956 | Shannon et al. | 429/175 |
| 2,942,055 | 6/1960 | Doyle et al. | 429/178 |
| 3,242,012 | 3/1966 | Sabatino | 429/178 |
| 3,262,719 | 7/1966 | Shannon | 429/163 |
| 3,600,232 | 8/1971 | Daguenet | 429/163 |
| 4,063,007 | 12/1977 | Spiegelberg | 429/176 |
| 4,276,360 | 6/1981 | Hardigg et al. | 429/175 |
| 4,374,187 | 2/1983 | Sano | 429/175 |
| 5,212,025 | 5/1993 | Shibata et al. | 429/176 |
| 5,498,488 | 3/1996 | Stocchiero | 429/175 |

Primary Examiner—Stephen Kalafut
Assistant Examiner—Carol Chaney
Attorney, Agent, or Firm—Harness, Dickey & Pierce, P.L.C.

[57] ABSTRACT

An improved housing system for a multi-cell battery including a container and a cover. The container has a bottom and a plurality of external walls cooperating to define a well and a plurality of internal walls which cooperate with the external walls and the bottom to define a plurality of cell reservoirs for receiving cells of a multi-cell battery. The external walls and the internal walls terminate in an array of edges oriented in a pattern substantially in a plane. The container and the cover are of material amenable to heat bonding. The improvement comprises the cover having an underside with a plurality of zones. Each zone has a respective thickness; one zone is oriented substantially in a plane and generally in register with the pattern of the array of edges presented by the container when the cover is positioned for attachment with the container. The one zone has a thickness which is greater than the thickness of adjacent zones. In the preferred embodiment, the adjacent zones and the one zone meet in transition loci having a radiused transition.

10 Claims, 2 Drawing Sheets

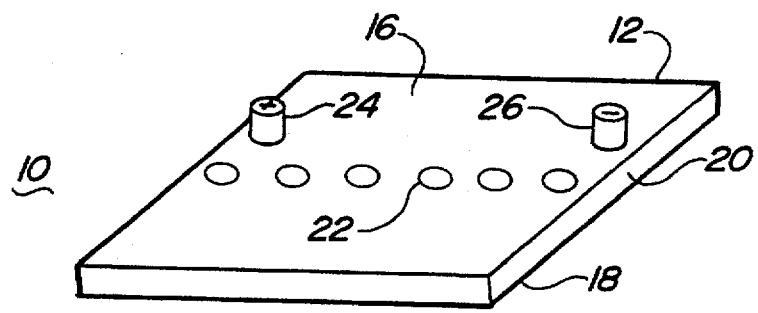
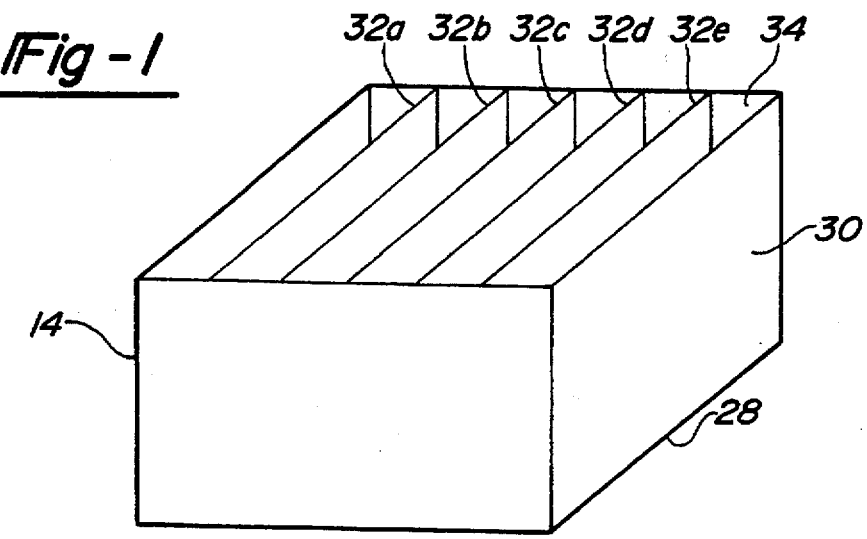
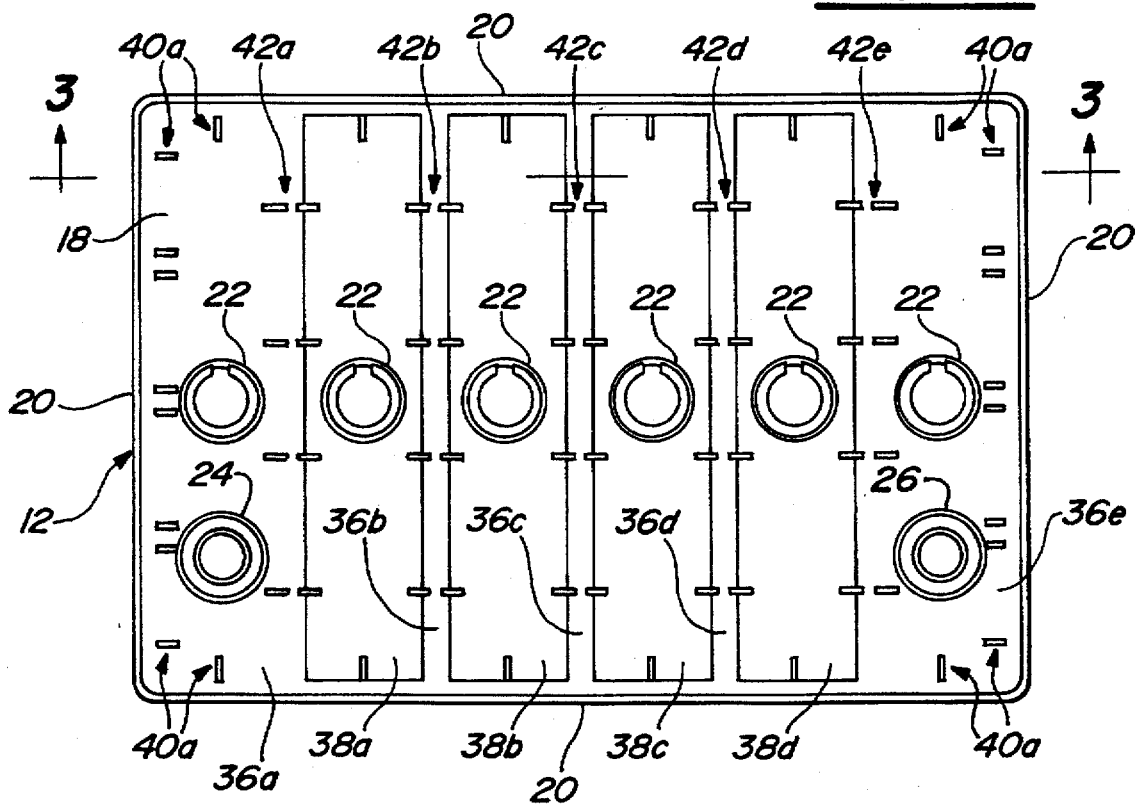

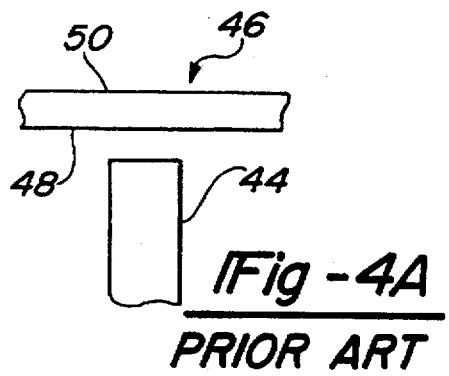
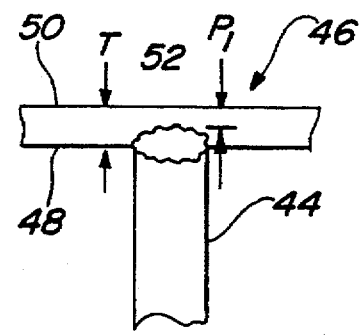
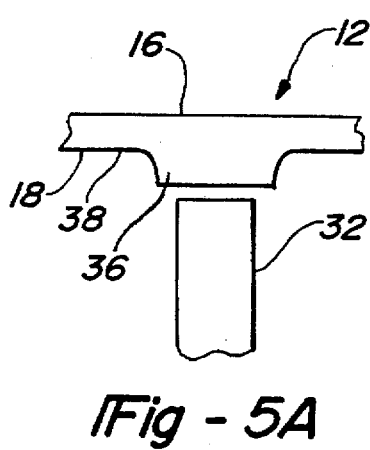
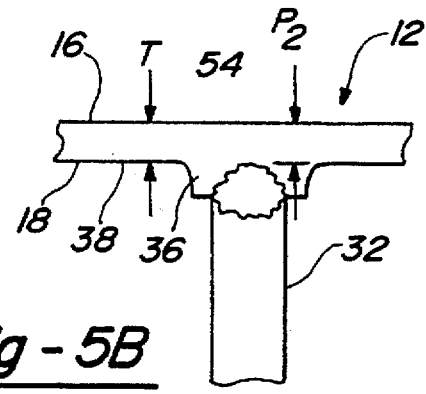
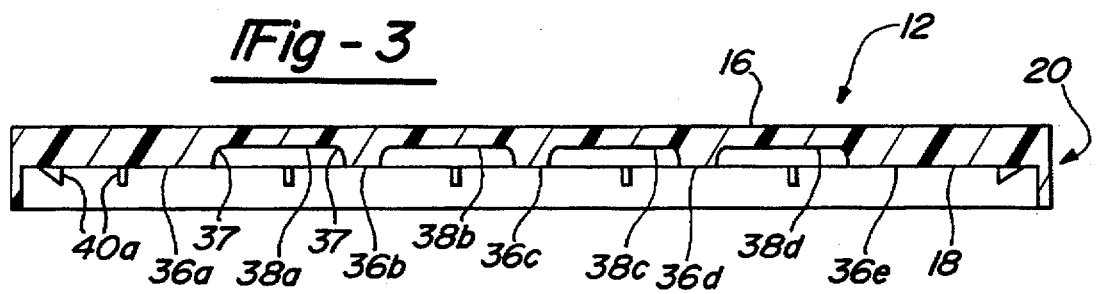

5,674,640

HOUSING SYSTEM FOR A MULTI-CELL BATTERY

CROSS REFERENCE TO RELATED APPLICATION

This application is a continuation-in-part of U.S. application Ser. No. 08/326,823, filed Oct. 20, 1994, now abandoned.

BACKGROUND OF THE INVENTION

The invention involves an improved housing system for a multi-cell battery, and, in particular an improved battery cover design configured to enhance resistance to explosive forces within the battery housing.

During normal operation of multi-cell batteries, such as lead-acid batteries, dissociation of the electrolyte employed in the battery chemistry constantly occurs during both charging and discharging operations. When the battery is well-charged electrical influences tend to dissociate the electrolyte. When the battery is discharging, chemical reactions encourage electrolyte dissociation. One result of such electrolyte dissociation is an accumulation of hydrogen and oxygen within the battery housing. When the ratio of hydrogen to oxygen is within the range from approximately 4% to 78%, a spark of sufficient magnitude generating sufficient heat may ignite the hydrogen and thereby cause an explosion within the battery housing. Such explosions frequently are sufficiently strong to rupture the battery housing. It is especially dangerous when such rupturing occurs at the top of the battery since a user may receive battery housing shards or sprayed electrolyte solution in the face.

Prior art solutions to this problem have attempted to absorb the force of explosion or limit the explosive gases to a sufficiently small volume to render any resulting explosion inconsequential. Such prior art solutions have employed such structural devices as mats, pillows or foam layers (both solid or reticulated) generally within the housing adjacent the cover. A problem with such structures as have been employed in prior art solutions is that batteries are often required to conform to dimensional requirements imposed by the marketplace and it is undesirable to add additional bulk or weight to them. Thus, such prior art solutions as mentioned above have serious drawbacks; they add bulk and weight to batteries.

As previously mentioned, of particular concern is the tendency of present lead-acid batteries to separate or vent explosive forces at the cover or through the cover. This is particularly problematic because consumers may likely be situated above the battery in such situations as when the lead-acid battery is being parallel connected for jump starting a car. In such situations, dissociation of the electrolyte may generate a hydrogen-oxygen mixture which may explosively react to a spark occurring while attaching battery cables for parallel connection. If the battery vents the explosive force through the cover the electrolyte, including acid, or battery parts may impact and severely injure a consumer near the battery.

There is, therefore, a need for an improved battery housing including an improved structure for attaching a battery cover with a battery container, which will enhance resistance to a separation of the cover from the container, or venting of explosive forces through the cover, during an explosion within the housing.

SUMMARY OF THE INVENTION

An improved housing system for a multi-cell battery including a container and a cover. The container has a bottom and a plurality of external walls cooperating to define a well. The container also has a plurality of internal walls which cooperate with the plurality of external walls and the bottom to define a plurality of cell reservoirs within the well for receiving respective cells of a multi-cell battery. The plurality of external walls and the plurality of internal walls terminate in an array of edges oriented in a pattern substantially in a plane. The container and the cover are of material amenable to heat bonding. The improvement comprises the cover having a topside and an underside with the underside having a plurality of zones. Each zone has a respective thickness; one zone of the plurality of zones has an outer surface which is oriented substantially in a plane and generally in register with the pattern of the array of edges presented by the container when the cover is positioned for attachment with the container. The one zone has an enhanced thickness which is greater than the thickness of adjacent zones of the plurality of zones. In the preferred embodiment of the present invention, the adjacent zones and the one zone meet in transition loci having a radiused transition.

It is, therefore, an object of the present invention to provide an improved housing system for a multi-cell battery which affects a reliable, repeatable, and strong bond between a cover and a container.

A further object of the present invention is to provide an improved housing system for a multi-cell battery which can withstand explosive forces occurring within the battery without separating the cover from the container or venting the explosive forces through the cover.

Further objects and features of the present invention will be apparent from the following specification and claims when considered in connection with the accompanying drawings illustrating the preferred embodiment of the invention.

BRIEF DESCRIPTION OF THE DRAWINGS

FIG. 1 is a perspective exploded view of a housing system for a multi-cell battery.

FIG. 2 is a plan view of the underside of the cover for an improved housing system according to the present invention.

FIG. 3 is a section view of the cover for the improved housing system of the present invention taken along Section 3—3 of FIG. 2.

FIG. 4 illustrates details of the joining of a cover and a container in a battery housing system according to the prior art.

FIG. 5 illustrates details of the joining of a cover and a container in an improved housing system according to the present invention.

DETAILED DESCRIPTION OF THE INVENTION

FIG. 1 is a perspective exploded view of a housing system for a multi-cell battery. In FIG. 1, a housing system 10 is comprised of a battery cover 12 and a container 14. Cover 12 has a topside 16 and an underside 18, and is surrounded by a skirt 20. A plurality of apertures 22 traverse cover 12 from topside 16 to underside 18. A positive post 24 and a negative post 26 are configured for connection (not shown) with cells within container 14. Thus, when a battery is assembled within housing system 10, access to the battery is attained via positive post 24 and negative post 26.

Container 14 includes a bottom 28, a plurality of external walls 30, and a plurality of internal walls 32. External walls 30 and internal walls 32 cooperate to establish a plurality of cell reservoirs 34 for receiving the respective cells (not shown) of a multi-cell battery.

In order to facilitate understanding of the present invention, like elements will be indicated using like reference numerals in the various drawings.

FIG. 2 is a plan view of the underside of the cover for an improved housing system according to the present invention.

In FIG. 2, cover 12 has a plurality of apertures 22 which traverse cover 12 from its topside 16 to its underside 18 (FIG. 1). Cover 12 also has a positive post 24 and a negative post 26.

Cover 12 is divided at its underside 18 into a plurality of zones: a first zone 36 is generally thicker and further displaced from topside 16 than is a second zone 38. First zone 36 is raised from a plane containing an outer surface of second zone 38. Second zone 38 is segmented into a plurality of zone sections 38a, 38b, 38c, 38d.

A plurality of guide tabs 40 are arrayed on underside 18 of cover 12 to assist in guiding walls 30, 32 into proper alignment for assembly with underside 18 to form housing system 10 in completing assembly of a battery. Thus, peripheral guide tabs 40a are arrayed in spaced relation with respect to skirt 20 in order to assist aligning external walls 30 for assembly with underside 18 substantially adjacent skirt 20.

A plurality of guide tabs 42a is arranged substantially in register with the proper position for internal wall 32a (FIG. 1) for assembly of housing system 10. Similarly, a plurality of guide tabs 42b assists in aligning internal wall 32b for assembly; a plurality of guide tabs 42c assists in positioning internal wall 32c properly for assembly; a plurality of guide tabs 42d assists in positioning internal wall 32d properly for assembly; and a plurality of guide tabs 42e assists in correctly positioning internal wall 32e for assembly.

First zone 36, in this preferred embodiment illustrated in FIG. 2, has a wider expanse in a first section 36a and a second section 36e in order to provide a more substantial support for posts 24, 26 as well as to provide a greater bond between cover 12 and container 14, as will be described in greater detail hereinafter. Other first zone sections 36b, 36c, 36d are substantially aligned for heat bonding with internal walls 32b, 32c, 32d (FIG. 1).

FIG. 3 is a section view of the cover for the improved housing system of the present invention taken along Section 3—3 of FIG. 2. In FIG. 3, cover 12 has a topside 16, an underside 18 and a circumferential skirt 20. FIG. 3 further illustrates thicker first zone 36, including zone sections 36a, 36b, 36c, 36d, 36e and second zone 38, including second zone sections 38a, 38b, 38c, 38d. In the preferred embodiment, zone 36 is approximately 2.0–2.5 times thicker than zone 38. First guide tabs 40a are, preferably, triangular in cross section with a sloping face 41a which serves to urge a respective external wall 30 into proper alignment with cover 12 during assembly of housing system 10. A radius 37 is preferably provided to establish a radiused transition intermediate first zone 36 and second zone 38 to further strengthen the structure of cover 12. Radius 37 is preferably approximately 0.040 to 0.200 inches.

It is not desirable to provide too great a total expanse for the thicker first zone 36 because the greater volume of material that is involved in manufacturing cover 12, the greater is the required cycle time for such manufacture. In its preferred embodiment, cover 12 is molded of polypropylene. In the preferred embodiment, first zone 36 is approximately 0.20 inch thick, and second zone 38 is approximately 0.10 inch thick. If the entire cover 12 were made 0.20 inch thick, cycle time for cooling the polypropylene following a molding operation would increase from being measured in seconds to being measured in minutes. Such an increase in cycle time dramatically negatively affects productivity. Also, such a thicker cover configuration would have an increased tendency to warp because of variations in cooling rate at various locations in the cover, thus further depressing productivity. Other shortcomings attending such a thicker cover configurations include increased incidence of sink marks or other deformities, an increase in cost of manufacture, and added weight and bulk.

The configuration of cover 12 illustrated in FIG. 2 limits the above adverse effects of thickening cover 12 to within acceptable parameters while realizing the benefits of a thicker cover 12 as will be discussed in greater detail in connection with FIGS. 4 and 5.

FIG. 4 illustrates details of the joining of a cover and a container in a battery housing system according to the prior art. In FIG. 4(a) a respective internal wall 44 is illustrated adjacent a cover 46 having an underside 48 and a topside 50. In FIG. 4(b), wall 44 and cover 46 have been heated and are urged together to effect heat bonding with wall 44 bearing against underside 48 of cover 46. During this process, a region 52 is heat-affected and is in a somewhat molten state, which disrupts its normally rigid structure. Thus, the normally rigid structure of the material of cover 46 after heat assembly, as illustrated in FIG. 4(b), extends a depth $D_1$ which is substantially less than the thickness T of cover 46. In the event of an explosion or other source of pressure pulse within the housing, the area in the vicinity of region 52 is weaker given the lesser dimension $D_1$ of rigid material intermediate topside 50 and region 52 in cover 56. The area in the vicinity of region 52 is a weak point at which cover 46 will detach from wall 44, or the explosive forces will be vented through cover 46 in the vicinity of region 52 in the event of such an explosion.

FIG. 5 illustrates details of the joining of a cover and a container in an improved housing system according to the present invention. In FIG. 5(a) a wall such as internal wall 32 is illustrated adjacent a raised portion of a first zone 36 situated on underside 18 of cover 12. In FIG. 5(b) internal wall 32 and cover 12 have been heated and urged together to effect heat bonding with wall 32 bearing against first zone 36. During this process, a region 54 of near-molten material results from the heating of wall 32 and cover 12 so that there is a distance $D_2$ intermediate region 54 and topside 16 of cover 12 which is not affected by the structural disruption of the preassembly heating of wall 32 and cover 12. Because of the fact that zone 36 is raised with respect to its adjacent zone 38, distance $D_2$ in the vicinity of region 54 is greater than or equal to thickness T of cover 12 in the vicinity of second zone 38. Thus, there is no degradation of the strength of cover 12 in the vicinity of region 54 and, therefore, no weak spot is presented which may be manifested in venting explosive forces through cover 12 or separating cover 12 from wall 32 in the event of an explosion within housing system 10.

It is to be understood that, while the detailed drawings and specific examples given describe preferred embodiments of the present invention, they are for the purpose of illustration, that the apparatus and method of the invention are not limited to the precise details and conditions disclosed, and that various changes may be made therein without departing from the spirit of the invention which is defined by the following claims.

We claim:

1. An improved housing system for a multi-cell battery; the housing system comprising:

a container, the container having a bottom and plurality of external walls cooperating to define a well, the container having a plurality of internal walls cooperating with the plurality of external walls and with the bottom to define a plurality of cell reservoirs within the well for receiving respective cells of the multi-cell battery; the plurality of external walls and the plurality of internal walls terminating in an array of edges, each of the edges defining a top surface, the array of edges being oriented in a pattern and the top surface of all of the edges lying substantially within a plane; the container being made of a heat bondable material; and a cover permanently heat bonded to the container, the cover having a top side, and an underside comprising a substantially planar surface and a plurality of raised surfaces extending from the planar surface, each of the raised surfaces terminating in a bottom surface, wherein the raised surfaces are oriented in accordance with the pattern and terminate substantially within a plane, said cover having a first thickness between the top side and the underside between the raised surfaces and a second thickness between the top side and the bottom surface of the raised surfaces, and wherein the top surfaces of the plurality of edges abut against the bottom surfaces of the plurality of raised surfaces in a heat bonded engagement such that the edges of the internal walls penetrate into the raised surfaces a distance where the distance between the top surfaces of the edges and the top side is equal to or greater than the first thickness, the raised surfaces further including a radiused transition into the underside.

2. The housing system of claim 1 wherein the second thickness is in the range of 1.0 to 1.5 times the first thickness.

3. The housing system of claim 1 wherein the radiused transition is the range of 0.040 to 0.200 inches.

4. The housing system of claim 3 wherein the cover further comprises a plurality of guide tabs formed on the underside adjacent the raised surfaces, the guide tabs adapted to engage the internal walls for aligning the cover with the container.

5. The housing system of claim 2 further comprising a positive and negative terminal post mounted to the cover in a region having a thickness substantially the same as the thickness of the raised surfaces.

6. An improved housing system for a multi-cell battery, the housing system comprising:

a container, the container having a bottom and plurality of external walls cooperating to define a well, the container having a plurality of internal walls cooperating with the plurality of external walls and with the bottom to define a plurality of cell reservoirs within the well for receiving respective cells of the multi-cell battery; the plurality of external walls and the plurality of internal walls terminating in an array of edges, each of the edges defining a top surface, the array of edges being oriented in a pattern and the top surfaces of each of the edges lying substantially within a plane; and a cover adapted for permanent attachment to the container and having an inside surface and an outside surface, the inside surface being configured for bonding to the container and including a first land substantially in a first plane and having a first thickness and a second land substantially in a second plane and having a second thickness and a radiused transition from the first land to the second land, the second land terminating in a bottom surface, the second thickness being greater than the first thickness and the second thickness being in register with the pattern when the cover and container are assembled, wherein the top surfaces of the plurality of edges abut against the bottom surface of the second land in a heat bonded engagement such that the edges of the internal walls penetrate into the second land a distance where the distance between the top surfaces of the edges and the outside surface is equal to or greater than the first thickness.

7. The housing system of claim 6 wherein the second thickness is in the range of 2.0 to 2.5 times the first thickness.

8. The housing system of claim 6 wherein the radiused transition is in the range of 0.040 to 0.200 inches.

9. The housing system of claim 6 wherein the cover further comprises a plurality of guide tabs formed on the underside adjacent the second land, the guide tabs adapted to engage the internal walls for aligning the cover with the container.

10. The housing system of claim 6 further comprising a positive and negative terminal post mounted to the cover in a region having a thickness substantially the same as the second thickness.

* * * * *